United States Patent [19]

Abe et al.

[11] Patent Number: 5,650,471
[45] Date of Patent: Jul. 22, 1997

[54] PROCESS FOR THE PRODUCTION OF CYCLOOLEFIN RANDOM COPOLYMER

[75] Inventors: Yoshiharu Abe, Yamaguchi-ken; Toshihiro Sagane, Tokyo, both of Japan

[73] Assignees: Mitsui Petrochemical Industries, Ltd., Tokyo, Japan; Hoechst Aktiengesellschaft, Frankfurt, Germany

[21] Appl. No.: 579,011

[22] Filed: Dec. 27, 1995

[30] Foreign Application Priority Data

Dec. 28, 1994 [JP] Japan ................................. 6-328548

[51] Int. Cl.$^6$ .............................. C08F 2/06; C08F 232/08
[52] U.S. Cl. ...................... 526/160; 526/126; 526/127; 526/133; 526/134; 526/151; 526/153; 526/170; 526/281; 526/282; 526/943
[58] Field of Search ..................... 526/134, 160, 526/170, 133, 153, 127, 281, 943

[56] References Cited

U.S. PATENT DOCUMENTS

| | | | |
|---|---|---|---|
| 5,003,019 | 3/1991 | Ishimaru et al. | 526/281 X |
| 5,008,356 | 4/1991 | Ishimaru et al. | 526/281 X |
| 5,142,007 | 8/1992 | Sagane et al. | 526/169.2 |

FOREIGN PATENT DOCUMENTS

| | | |
|---|---|---|
| 0504418 | 9/1992 | European Pat. Off. |
| 61-221206 | 10/1986 | Japan. |

*Primary Examiner*—Fred Teskin
*Attorney, Agent, or Firm*—Sherman and Shalloway

[57] ABSTRACT

There is provided a process for the production of a cycloolefin copolymer which comprises copolymerizing an $\alpha$-olefin having 2 or more carbon atoms and a specific cycloolefin in the presence of a specific metallocene type catalyst in a solvent mixture of a hydrocarbon solvent having a solubility parameter (value of $\delta$) of 7.7 $[(cal/cm^3)^{1/2}]$ or more and a hydrocarbon solvent having a solubility parameter (value of $\delta$) of 7.5 $[(cal/cm^3)^{1/2}]$ or less as a polymerization solvent. A cycloolefin copolymer having a high molecular weight can be produced in a high concentration by this process at a high yield.

5 Claims, No Drawings

PROCESS FOR THE PRODUCTION OF CYCLOOLEFIN RANDOM COPOLYMER

BACKGROUND OF THE INVENTION

1. Field of the Invention

This invention relates to a process for the production of a cycloolefin random copolymer. More specifically, it relates to a process for the production of a cycloolefin random copolymer, which permits the production of a cycloolefin-based random copolymer having a high molecular weight at a high yield.

2. Prior Art

A copolymer of ethylene and a specific bulky cycloolefin is a synthetic resin whose optical, mechanical and thermal properties are well balanced and used in the field of optical materials such as optical memory disks and optical fibers. It is already known that such a cycloolefin copolymer can be produced by copolymerizing ethylene and cycloolefin using a catalyst formed from (i) a transition metal compound, (ii) an organic aluminum oxy compound and/or a compound capable of forming an ionic complex when it reacts with a transition metal compound, and (iii) an organic aluminum compound as required. The copolymerization in such a catalytic system is usually carried out in a solvent having a high solubility parameter, such as toluene or benzene. However, when a cycloolefin copolymer having high heat resistance is to be synthesized in such a solvent, the proportion of the cycloolefin based on the total concentration of monomers in a polymerizer must be increased. Therefore, when α-olefin is ethylene, for example, it is impossible to raise the partial pressure of ethylene, thereby causing such problems as a reduction in polymerization speed, an incomplete reaction, and a large volume of cycloolefin to be recovered after polymerization.

When a cycloolefin copolymer is to be synthesized in a solvent having a high solubility parameter in a high concentration, namely, 80 g/l or more, the viscosity of a polymerization system becomes high, thereby making it difficult to remove polymerization heat and maintain the uniform distribution of monomer components in the polymerization system, and lowering the transportability of a polymer solution.

SUMMARY OF THE INVENTION

It is therefore an object of the invention to provide a novel process for the production of a cycloolefin random copolymer It is another object of the present invention to provide a process for efficiently producing a cycloolefin random copolymer in a high concentration with a high polymerization rate.

Further objects and advantages of the present invention will be apparent from the following description.

According to the present invention, the above objects and advantages can be attained by a process for the production of a cycloolefin random copolymer which comprises copolymerizing (1) (i) an α-olefin having 2 or more carbon atoms and (ii) at least one cycloolefin selected from the group consisting of monomers represented by the following formula (I):

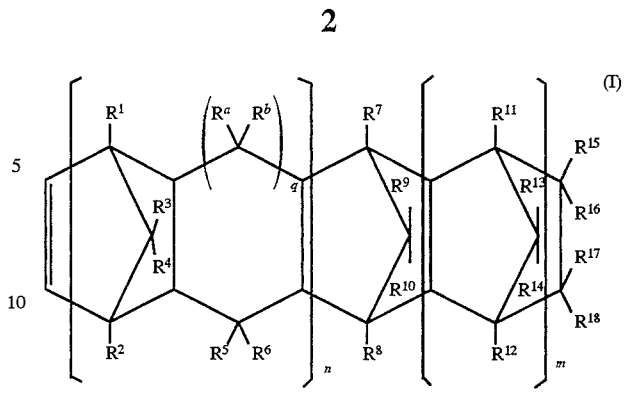

wherein n is 0 or 1, m is 0 or a positive integer, q is 0 or 1, $R^1$ to $R^{18}$, $R^a$ and $R^b$ are independently selected from the group consisting of a hydrogen atom, halogen atom and hydrocarbon group, two out of $R^{15}$ to $R^{18}$ may jointly form a single hydrocarbon ring or multiple hydrocarbon rings including carbon atoms bonded thereto, and the single ring or multiple rings may have a double bond, and $R^{15}$ and $R^{16}$ or $R^{17}$ and $R^{18}$ may form an alkylidene group, and formula (II):

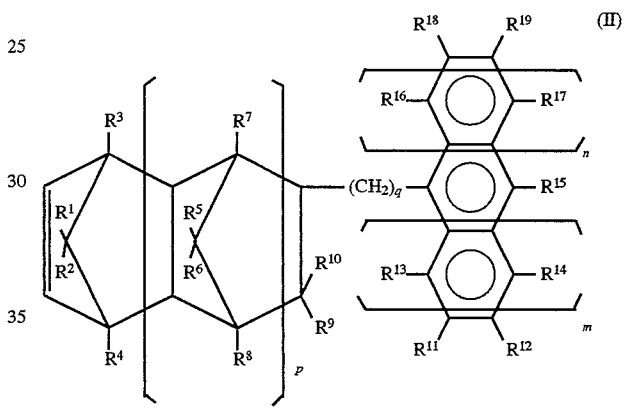

wherein p and q are each 0 or an integer of 1 or more, m and n are each 0, 1 or 2, $R^1$ to $R^{19}$ are independently selected from the group consisting of a hydrogen atom, halogen atom, aliphatic hydrocarbon group, alicyclic hydrocarbon group, aromatic hydrocarbon group and alkoxy group, the carbon atom bonded to $R^9$ and $R^{10}$ and the carbon atom bonded to $R^{13}$ or $R^{11}$ may bonded together directly or through an alkylene group having 1 to 3 carbon atoms, and $R^{15}$ and $R^{12}$ or $R^{15}$ and $R^{19}$ may jointly form a monocyclic or polycyclic aromatic ring including carbon atoms bonded thereto when n=m=0, (2) in the presence of a catalyst formed from (i) a transition metal compound as a catalyst component (a) represented by the following formula (III):

wherein $M^1$ is titanium, zirconium, hafnium, vanadium, niobium or tantalum, $R^1$ and $R^2$ are independently selected from the group consisting of a hydrogen atom, halogen atom, alkyl group having 1 to 10 carbon atoms, alkoxy group having 1 to 10 carbon atoms, aryl group having 6 to 10 carbon atoms, aryl oxy group having 6 to 10 carbon atoms, alkenyl group having 2 to 10 carbon atoms, aryl alkyl group having 7 to 40 carbon atoms, alkyl aryl group having 7 to 40 carbon atoms and aryl alkenyl group having 8 to 40 carbon atoms, $R^3$ and $R^4$ are independently a mononuclear or polynuclear hydrocarbon group having a cyclopentadienyl skeleton capable of forming a sandwich structure together with a central metal $M^1$, and $R^5$ is one of the following divalent groups:

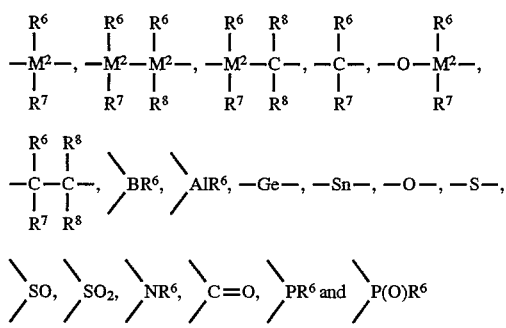

in which $R^6$, $R^7$ and $R^8$ are independently selected from the group consisting of a hydrogen atom, halogen atom, alkyl group having 1 to 10 carbon atoms, fluoroalkyl group having 1 to 10 carbon atoms, fluoroaryl group having 6 to 10 carbon atoms, aryl group having 6 to 10 carbon atoms, alkoxy group having 1 to 10 carbon atoms, alkenyl group having 2 to 10 carbon atoms, aryl alkyl group having 7 to 40 carbon atoms, alkyl aryl group having 7 to 40 carbon atoms and alkyl alkenyl group having 8 to 40 carbon atoms, $R^6$ and $R^7$ or $R^6$ and $R^8$ may jointly form a ring including an atom bonded thereto, and $M^2$ is silicon, germanium or tin, and (ii) at least one catalyst component (b) selected from the group consisting of organic aluminum oxy compounds and compounds capable of forming an ionic complex when they react with the above transition metal compound, (3) in a solvent mixture comprising (i) a hydrocarbon solvent having a solubility parameter (value of δ) of 7.7 [$(cal/cm^3)^{1/2}$] or more and (ii) a hydrocarbon solvent having a solubility parameter (value of δ) of 7.5 [$(cal/cm^3)^{1/2}$] or less in a volume ratio [(i)/(ii)] of 99/1 to 50/50.

The present invention is described in detail hereinunder.

DETAILED DESCRIPTION OF THE INVENTION

One of the monomers used in the process of the present invention is an α-olefin having 2 or more carbon atoms selected from α-olefins having 2 to 20 carbon atoms, such as ethylene, propylene, 1-butene, 1-pentene, 1-hexene, 4-methyl-1-pentene, 1-octene, 1-decene, 1-dodecene, 1-tetradecene, 1-hexadecene, 1-octadecene, 1-eicosene and the like. These α-olefins may be used alone or in combination of two or more. Among these, ethylene is particularly preferred.

The cycloolefin to be copolymerized with the above α-olefin is at least one compound represented by the above formula (I) or (II).

In the formula (I), n is 0 or 1, m is 0 or a positive integer, and q is 0 or 1.

$R^1$ to $R^{18}$, $R^a$ and $R^b$ are independently selected from a hydrogen atom, halogen atom and hydrocarbon group.

Illustrative examples of the halogen atom include fluorine, chlorine, bromine and iodine. Illustrative examples of the hydrocarbon group include alkyl group having 1 to 20 carbon atoms, halogenated alkyl group having 1 to 20 carbon atoms, cycloalkyl group having 3 to 15 carbon atoms and aromatic hydrocarbon group having 6 to 20 carbon atoms. Specific examples of the alkyl group include methyl, ethyl, propyl, isopropyl, amyl, hexyl, octyl, decyl, dodecyl, octadecyl and the like. These alkyl groups may be substituted by a halogen atom. Specific examples of the cycloalkyl group include cyclohexyl group, and those of the aromatic hydrocarbon group include phenyl, naphthyl and the like.

In the above formula (I), $R^{15}$ and $R^{16}$, $R^{17}$ and $R^{18}$, $R^{15}$ and $R^{17}$, $R^{16}$ and $R^{18}$, $R^{15}$ and $R^{18}$, or $R^{16}$ and $R^{17}$ may jointly form a monocyclic or polycyclic group including a carbon atom coupled thereto. The single ring or multiple rings thus formed may have a double bond. Specific examples of the single ring or multiple rings are as follows.

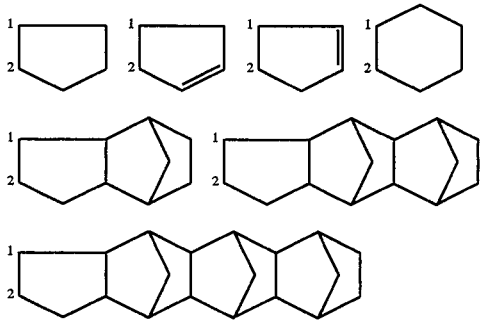

In the above examples, the carbon atoms numbered 1 and 2 are carbon atoms bonded to $R^{15}$ ($R^{16}$) or $R^{17}$ ($R^{18}$) in the formula (I), respectively.

$R^{15}$ and $R^{16}$ or $R^{17}$ and $R^{18}$ may form an alkylidene group. The alkylidene group generally has 2 to 20 carbon atoms with examples thereof including ethylidene, propylidene and isopropylidene.

In the above formula (II), p and q are each 0 or a positive integer, and m and n are each 0, 1 or 2.

$R^1$ to $R^{19}$ are independently selected from the group consisting of a hydrogen atom, halogen atom, hydrocarbon group and alkoxy group.

Examples of the halogen atom are the same as those of the halogen atom in the above formula (I).

The hydrocarbon group is selected from alkyl group having 1 to 20 carbon atoms, cycloalkyl group having 3 to 15 carbon atoms and aromatic hydrocarbon group. Illustrative examples of the alkyl group include methyl, ethyl, propyl, isopropyl, amyl, hexyl, octyl, decyl, dodecyl, octadecyl and the like. These alkyl groups may be substituted by a halogen atom. Examples of the cycloalkyl group include cyclohexyl. Examples of the aromatic hydrocarbon group include aryl group, aralkyl group and the like, more specifically, phenyl, tolyl, naphthyl, benzyl and phenylethyl.

Illustrative examples of the alkoxy group include methoxy, ethoxy, propoxy and the like.

In the formula (II), the carbon atom bonded to $R^9$ and $R^{10}$ and the carbon atom bonded to $R^{13}$ or $R^{11}$ may be bonded together directly or through an alkylene group having 1 to 3 carbon atoms. When the above two carbon atoms are bonded together through the alkylene group, the alkylene group is either one of methylene group (—$CH_2$—), ethylene group (—$CH_2CH_2$—) and trimethylene group (—$CH_2CH_2CH_2$—).

When n=m=0, $R^{15}$ and $R^{12}$ or $R^{15}$ and $R^{19}$ may jointly form a monocyclic or polycyclic aromatic ring including carbon atoms bonded thereto. Specifically, when n=m=0, the aromatic ring formed by $R^{15}$ and $R^{12}$ is either one of the following rings (portions circled by broken lines).

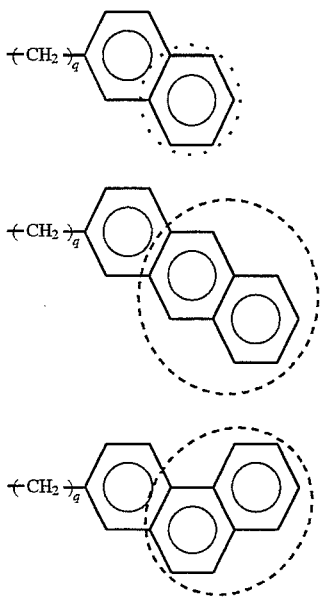

In the above formulas, q is defined the same as in the formula (II).

Illustrative examples of the cycloolefin represented by the above formula (I) or (II) are given below.

Bicyclo[2.2.1]-2-heptene (commonly named norbornene) represented by the following formula:

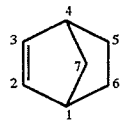

wherein numerals 1 to 7 indicate position numbers of carbon atoms, and derivatives thereof in which the hydrogen atom of the compound is substituted by a hydrocaron group are first included in the examples.

Illustrative examples of the hydrocarbon group include 5-methyl, 5,6-dimethyl, 1-methyl, 5-ethyl, 5-n-butyl, 5-isobutyl, 7-methyl, 5-phenyl, 5-methyl-5-phenyl, 5-benzyl, 5-tolyl, 5-(ethylphenyl), 5-(isopropylphenyl), 5-(biphenyl), 5-(β-naphthyl), 5-(α-naphthyl), 5-(antracenyl), 5,6-diphenyl and the like.

Illustrative examples of the derivatives include bicyclo[2.2.1]-2-heptene derivatives such as adduct of cyclopentadiene with acenaphthylene, 1,4-methano-1,4,4a,9a-tetrahydrofluorene, 1,4-methano-1,4,4a,5,10,10a-hexahydroanthracene; tricyclo[4.3.0.1$^{2,5}$]-3-decene derivatives such as tricyclo[4.3.0.1$^{2,5}$]-3-decene, 2-methyltricyclo[4.3.0.1$^{2,5}$]-3-decene and 5-methyltricyclo[4.3.0.1$^{2,5}$]-3-decene; tricyclo[4.4.0.1$^{2,5}$]-3-undecene derivatives such as tricyclo[4.4.0.1$^{2,5}$]-3-undecene and 10-methyltricyclo[4.4.0.1$^{2,5}$]-3-undecene; and tetracyclo[4.4.0.1$^{2,5}$.1$^{7,10}$]-3-dodecene represented by the following formula:

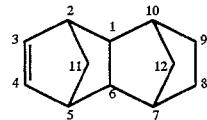

and derivatives thereof in which the hydrogen atom of the compound is substituted by a hydrocarbon group.

Illustrative examples of the hydrocarbon group include 8-methyl, 8-ethyl, 8-propyl, 8-butyl, 8-isobutyl, 8-hexyl, 8-cyclohexyl, 8-stearyl, 5,10-dimethyl, 2,10-dimethyl, 8,9-dimethyl, 8-ethyl-9-methyl, 11,12-dimethyl, 2,7,9-trimethyl, 2,7-dimethyl-9-ethyl, 9-isobutyl-2,7-dimethyl, 9,11,12-trimethyl, 9-ethyl-11,12-dimethyl, 9-isobutyl-11,12-dimethyl, 5,8,9,10-tetramethyl, 8-ethylidene, 8-ethylidene-9-methyl, 8-ethylidene-9-ethyl, 8-ethylidene-9-isopropyl, 8-ethylidene-9-butyl, 8-n-propylidene, 8-n-propylidene-9-methyl, 8-n-propylidene-9-ethyl, 8-n-propylidene-9-isopropyl, 8-n-propylidene-9-butyl, 8-isopropylidene, 8-isopropylidene-9-methyl, 8-isopropylidene-9-ethyl, 8-isopropylidene-9-isopropyl, 8-isopropylidene-9-butyl, 8-chloro, 8-bromo, 8-fluoro, 8,9-dichloro, 8-phenyl, 8-methyl-8-phenyl, 8-benzyl, 8-tolyl, 8-(ethlphenyl), 8-(isopropylphenyl), 8,9-diphenyl, 8-(biphenyl), 8-(β-naphthyl), 8-(α-naphthyl), 8-(anthracenyl)), 5,6-diphenyl and the like.

Further examples of the derivatives include tetracyclo[4.4.0.1$^{2,5}$.1$^{7,10}$]-3-dodecene derivatives such as adduct of (cyclopentadiene-acenaphthylene adduct) with cyclopentadiene, pentacyclo[6.5.1.1$^{3,6}$.0$^{2,7}$.0$^{9,13}$]-4-pentadecene and derivatives thereof, pentacyclo[7.4.0.1$^{2,5}$.1$^{9,12}$.0$^{8,13}$]-3-pentadecene and derivatives thereof, pentacyclo[8.4.0.1$^{2,5}$.1$^{9,12}$.0$^{8,13}$]-3-hexadecene and derivatives thereof, pentacyclo[6.6.1.1$^{3,6}$.0$^{2,7}$.0$^{9,14}$]-4-hexadecene and derivatives thereof, hexacyclo[6.6.1.1$^{3,6}$.1$^{10,13}$.0$^{2,7}$.0$^{9,14}$]-4-heptadecene and derivatives thereof, heptacyclo[8.7.0.1$^{2,9}$.1$^{4,7}$.1$^{11,17}$.0$^{3,8}$.0$^{12,16}$]-5-eicosene and derivatives thereof, heptacyclo[8.7.0.1$^{3,6}$.1$^{10,17}$.1$^{12,15}$.0$^{2,7}$.0$^{11,16}$]-4-eicosene and derivatives thereof, heptacyclo[8.8.0.1$^{2,9}$.1$^{4,7}$.1$^{11,18}$.0$^{3,8}$.0$^{12,17}$]-5-heneicosene and derivatives thereof, octacyclo[8.8.0.1$^{2,9}$.1$^{4,7}$.1$^{11,18}$.1$^{13,16}$.0$^{3,8}$.0$^{12,17}$]-5-docosen and derivatives thereof, and nonacyclo[10.9.1.1$^{4,7}$.1$^{13,20}$.1$^{15,18}$.0$^{2,10}$.0$^{3,8}$.0$^{12,21}$.0$^{14,19}$]-5-pentacosene and derivatives thereof.

Illustrative examples of the cycloolefin represented by the general formula [I] or [II] have been given above, but the more concrete structures of these compounds are shown on pages 9 to 27 of European Patent Publication No. 0597119A1. These compounds can be used as a cycloolefin in the present invention.

The cycloolefin represented by the above general formula (I) or (II) may be produced by subjecting an olefin having a structure corresponding to cyclopentadiene to a Diels-Alder reaction.

Units derived from the cycloolefin represented by the above formula (I) or (II) and constituting a cycloolefin copolymer are considered to be represented by the following formula (I') or (II').

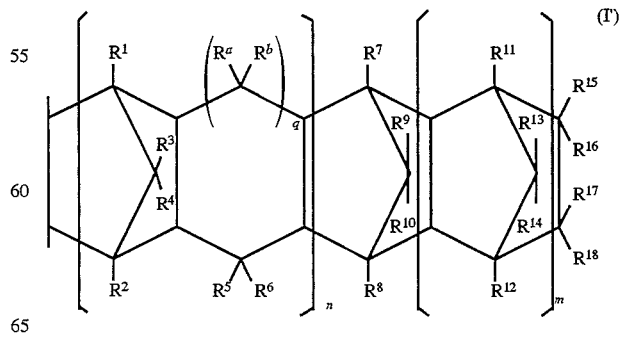

wherein m, n, q, $R^1$ to $R^{16}$, $R^a$ and $R^b$ are defined the same as in the above formula (I).

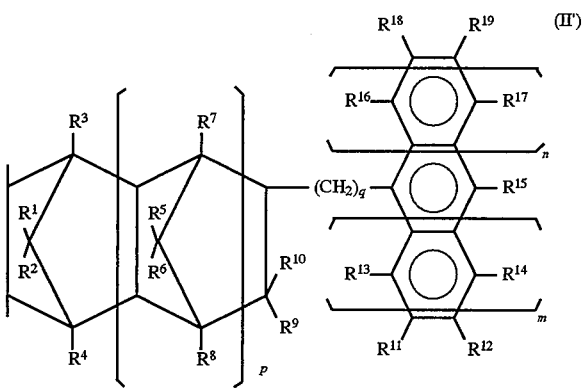

wherein n, m, p, q and $R^1$ to $R^{19}$ are defined the same as in the above formula (II).

The cycloolefins represented by the above formulas (I) and (II) may be used alone or in combination of two or more.

Copolymerization of the above α-olefin and the cycloolefin in the process of the present invention is carried out in the presence of a specific catalyst formed from a transition metal compound as the afore-mentioned catalyst component (a), the catalyst component (b) and an organic aluminum compound as the catalyst component (c) as required.

A detailed description is subsequently given of these catalyst components (a), (b) and (c).

The transition metal compound as the catalyst component (a) is a compound represented by the above formula (III). In the formula (III), the transition metal $M^1$ is titanium, zirconium, hafnium, vanadium, niobium or tantalum, of which zirconium and hafnium are preferred.

In the formula (III) $R^1$ and $R^2$ are independently selected from the group consisting of a hydrogen atom, halogen atom, alkyl group having 1 to 10 carbon atoms, alkoxy group having 1 to 10 carbon atoms, aryl group having 6 to 10 carbon atoms, aryl oxy group having 6 to 10 carbon atoms, alkenyl group having 2 to 10 carbon atoms, aryl alkyl group having 7 to 40 carbon atoms, alkyl aryl group having 7 to 40 carbon atoms, and aryl alkenyl group having 8 to 40 carbon atoms.

Examples of the halogen atom include fluorine, chlorine, bromine and iodine.

Examples of the alkyl group having 1 to 10 carbon atoms include methyl, ethyl, propyl, butyl, hexyl, octyl, decyl and the like.

Examples of the alkoxy group having 1 to 10 carbon atoms include methoxy, ethoxy, propoxy, butoxy, hexoxy, octoxy, decyloxy and the like.

Examples of the aryl group having 6 to 10 carbon atoms include phenyl, naphthyl and the like.

Examples of the aryl oxy group having 6 to 10 carbon atoms include phenyloxy, naphthyloxy and the like.

Examples of the alkenyl group having 2 to 10 carbon atoms include ethenyl, propenyl, 4-methyl-1-pentenyl, decenyl and the like.

Examples of the alkyl aryl group having 7 to 40 carbon atoms include tolyl, ethylphenyl, propylphenyl, n-butylphenyl, t-butylphenyl and the like.

Examples of the aryl alkyl group having 7 to 40 carbon atoms include benzyl, phenethyl, 1-phenylpropyl and the like.

Examples of the aryl alkenyl group having 8 to 40 carbon atoms include phenylethylenyl and the like.

In the above formula (III), $R^3$ and $R^4$ are each a mononuclear or polynuclear hydrocarbon group having a cyclopentadienyl skeleton capable of forming a sandwich structure with the central metal $M^1$.

Preferred examples of $R^3$ and $R^4$ include cyclopentadienyl group and substituents thereof, indenyl group and substituents thereof, and fluorenyl group and substituents thereof. Preferred combinations of $R^3$ and $R^4$ include a combination of cyclopentadienyl group or a substituent thereof and indenyl group or a substituent thereof, a combination of cyclopentadienyl group or a substituent thereof and fluorenyl group or a substituent thereof, and a combination of indenyl groups or substituents thereof.

Further, in the above formula (III), $R^5$ is a divalent group represented by the above formula. In the above formula, $R^6$, $R^7$ and $R^8$ can be each independently a group or atom as described above.

A description is subsequently given of groups and atoms for $R^6$, $R^7$ and $R^8$.

Examples of the halogen atom include fluorine, chlorine, bromine and iodine.

Preferred examples of the alkyl group having 1 to 10 carbon atoms include methyl, ethyl, propyl, butyl, hexyl, octyl, decyl and the like.

Examples of the fluoroalkyl group having 1 to 10 carbon atoms include trifluoromethyl, pentafluoroethyl, octafluoropropyl and the like.

Examples of the fluoroaryl group having 6 to 10 carbon atoms include pentafluorophenyl and the like.

Examples of the aryl group having 6 to 10 carbon atoms include phenyl, naphthyl and the like.

Examples of the alkoxy group having 1 to 10 carbon atoms include methoxy, ethoxy, propoxy, butoxy, hexoxy, octoxy, decyloxy and the like.

Examples of the alkenyl group having 2 to 10 carbon atoms include ethenyl, propenyl, 4-methyl-1-pentenyl, decenyl and the like.

Examples of the alkyl aryl group having 7 to 40 carbon atoms include tolyl, ethylphenyl, propylphenyl, n-butylphenyl, t-butylphenyl and the like.

Examples of the aryl alkyl group having 7 to 40 carbon atoms include benzyl, phenethyl, 1-phenylpropyl and the like.

Examples of the aryl alkenyl group having 8 to 40 carbon atoms include phenylethylenyl and the like.

As described above; $R^6$ and $R^7$ or $R^6$ and $R^8$ may be bonded together to form a ring together with an atom bonded thereto.

$M^2$ is silicon, germanium or tin.

Illustrative examples of the transition metal compound represented by the above formula (III) wherein the transition metal is zirconium are given below:

isopropylidene(cyclopentadienyl-methylcyclopentadienyl) zirconium dichloride,
isopropylidene(cyclopentadienyl-dimethylcyclopentadienyl)zirconium dichloride,
isopropylidene(cyclopentadienyl-trimethylcyclopentadienyl)zirconium dichloride,
isopropylidene(cyclopentadienyl-tetramethylcyclopentadienyl)zirconium dichloride,
isopropylidene(cyclopentadienyl-ethylcyclopentadienyl) zirconium dichloride,
isopropylidene(cyclopentadienyl-diethylcyclopentadienyl) zirconium dichloride,
isopropylidene(cyclopentadienyl-triethylcyclopentadienyl) zirconium dichloride,
isopropylidene(cyclopentadienyl-tetraethylcyclopentadienyl)zirconium dichloride,
isopropylidene(cyclopentadienyl-fluorenyl)zirconium dichloride,
isopropylidene(cyclopentadienyl-2,7-di-t-butylfluorenyl) zirconium dichloride, isopropylidene(cyclopentadienyl-octahydrofluorenyl)zirconium dichloride,
isopropylidene(methylcyclopentadienyl-fluorenyl)zirconium dichloride,
isopropylidene(dimethylcyclopentadienyl-fluorenyl)zirconium dichloride,
isopropylidene(ethylcyclopentadienyl-fluorenyl)zirconium dichloride,
isopropylidene(diethylcyclopentadienyl-fluorenyl)zirconium dichloride,
isopropylidene(methylcyclopentadienyl-2,7-di-t-butylfluorenyl)zirconium dichloride,
isopropylidene(dimethylcyclopentadienyl-2,7-di-t-butylfluorenyl)zirconium dichloride,
isopropylidene(ethylcyclopentadienyl-2,7-di-t-butylfluorenyl)zirconium dichloride,
isopropylidene(diethylcyclopentadienyl-2,7-di-t-butylfluorenyl)zirconium dichloride,
isopropylidene(methylcyclopentadienyl-octahydrofluorenyl)zirconium dichloride,
isopropylidene(dimethylcyclopentadienyl-octahydrofluorenyl)zirconium dichloride,
isopropylidene(ethylcyclopentadienyl-octahydrofluorenyl)zirconium dichloride,
isopropylidene(diethylcyclopentadienyl-octahydrofluorenyl)zirconium dichloride,
cyclohexylidene(cyclopentadienyl-methylcyclopentadienyl)zirconium dichloride,
cyclohexylidene(cyclopentadienyl-dimethylcyclopentadienyl)zirconium dichloride,
cyclohexylidene(cyclopentadienyl-trimethylcyclopentadienyl)zirconium dichloride,
cyclohexylidene(cyclopentadienyl-tetramethylcyclopentadienyl)zirconium dichloride,
cyclohexylidene(cyclopentadienyl-ethylcyclopentadienyl)zirconium dichloride,
cyclohexylidene(cyclopentadienyl-diethylcyclopentadienyl)zirconium dichloride,
cyclohexylidene(cyclopentadienyl-triethylcyclopentadienyl)zirconium dichloride,
cyclohexylidene(cyclopentadienyl-tetraethylcyclopentadienyl)zirconium dichloride,
cyclohexylidene(cyclopentadienyl-fluorenyl)zirconium dichloride,
cyclohexylidene(cyclopentadienyl-2,7-di-t-butylfluorenyl)zirconium dichloride,
cyclohexylidene(cyclopentadienyl-octahydrofluorenyl)zirconium dichloride,
cyclohexylidene(methylcyclopentadienyl-fluorenyl)zirconium dichloride,
cyclohexylidene(dimethylcyclopentadienyl-fluorenyl)zirconium dichloride,
cyclohexylidene(ethylcyclopentadienyl-fluorenyl)zirconium dichloride,
cyclohexylidene(diethylcyclopentadienyl-fluorenyl)zirconium dichloride,
cyclohexylidene(methylcyclopentadienyl-2,7-di-t-butylfluorenyl)zirconium dichloride,
cyclohexylidene(dimethylcyclopentadienyl-2,7-di-t-butylfluorenyl)zirconium dichloride,
cyclohexylidene(ethylcyclopentadienyl-2,7-di-t-butylfluorenyl)zirconium dichloride,
cyclohexylidene(diethylcyclopentadienyl-2,7-di-t-butylfluorenyl)zirconium dichloride,
cyclohexylidene(methylcyclopentadienyl-octahydrofluorenyl)zirconium dichloride,
cyclohexylidene(dimethylcyclopentadienyl-octahydrofluorenyl)zirconium dichloride,
cyclohexylidene(ethylcyclopentadienyl-octahydrofluorenyl)zirconium dichloride,
cyclohexylidene(diethylcyclopentadienyl-octahydrofluorenyl)zirconium dichloride,
diphenylmethylene(cyclopentadienyl-methylcyclopentadienyl)zirconium dichloride,
diphenylmethylene(cyclopentadienyl-dimethylcyclopentadienyl)zirconium dichloride,
diphenylmethylene(cyclopentadienyl-trimethylcyclopentadienyl)zirconium dichloride,
diphenylmethylene(cyclopentadienyl-tetramethylcyclopentadienyl)zirconium dichloride,
diphenylmethylene(cyclopentadienyl-ethylcyclopentadienyl)zirconium dichloride,
diphenylmethylene(cyclopentadienyl-diethylcyclopentadienyl)zirconium dichloride,
diphenylmethylene(cyclopentadienyl-triethylcyclopentadienyl)zirconium dichloride,
diphenylmethylene(cyclopentadienyl-tetraethylcyclopentadienyl)zirconium dichloride,
diphenylmethylene(cyclopentadienyl-fluorenyl)zirconium dichloride,
diphenylmethylene(cyclopentadienyl-2,7-di-t-butylfluorenyl)zirconium dichloride,
diphenylmethylene(cyclopentadienyl-octahydrofluorenyl)zirconium dichloride,
diphenylmethylene(methylcyclopentadienyl-fluorenyl)zirconium dichloride,
diphenylmethylene(dimethylcyclopentadienyl-fluorenyl)zirconium dichloride,
diphenylmethylene(ethylcyclopentadienyl-fluorenyl)zirconium dichloride,
diphenylmethylene(diethylcyclopentadienyl-fluorenyl)zirconium dichloride,
diphenylmethylene(methylcyclopentadienyl-2,7-di-t-butylfluorenyl)zirconium dichloride,
diphenylmethylene(dimethylcyclopentadienyl-2,7-di-t-butylfluorenyl)zirconium dichloride,
diphenylmethylene(ethylcyclopentadienyl-2,7-di-t-butylfluorenyl)zirconium dichloride,
diphenylmethylene(diethylcyclopentadienyl-2,7-di-t-butylfluorenyl)zirconium dichloride,
diphenylmethylene(methylcyclopentadienyl-octahydrofluorenyl)zirconium dichloride,
diphenylmethylene(dimethylcyclopentadienyl-octahydrofluorenyl)zirconium dichloride,
diphenylmethylene(ethylcyclopentadienyl-octahydrofluorenyl)zirconium dichloride,
diphenylmethylene(diethylcyclopentadienyl-octahydrofluorenyl)zirconium dichloride,
dimethylsilylene(cyclopentadienyl-methylcyclopentadienyl)zirconium dichloride,
dimethylsilylene(cyclopentadienyl-dimethylcyclopentadienyl)zirconium dichloride,
dimethylsilylene(cyclopentadienyl-trimethylcyclopentadienyl)zirconium dichloride,
dimethylsilylene(cyclopentadienyl-tetramethylcyclopentadienyl)zirconium dichloride,
dimethylsilylene(cyclopentadienyl-ethylcyclopentadienyl)zirconium dichloride,
dimethylsilylene(cyclopentadienyl-diethylcyclopentadienyl)zirconium dichloride,
dimethylsilylene(cyclopentadienyl-triethylcyclopentadienyl)zirconium dichloride,
dimethylsilylene(cyclopentadienyl-tetraethylcyclopentadienyl)zirconium dichloride,
dimethylsilylene(cyclopentadienyl-fluorenyl)zirconium dichloride, dimethylsilylene(cyclopentadienyl-2,7-d-t-butylfluorenyl) zirconium dichloride,
dimethylsilylene(cyclopentadienyl-octahydrofluorenyl) zirconium dichloride,
dimethylsilylene(methylcyclopentadienyl-fluorenyl) zirconium dichloride,
dimethylsilylene(dimethylcyclopentadienyl-fluorenyl) zirconium dichloride,
dimethylsilylene(ethylcyclopentadienyl-fluorenyl) zirconium dichloride,
dimethylsilylene(diethylcyclopentadienyl-fluorenyl) zirconium dichloride,
dimethylsilylene(methylcyclopentadienyl-2,7-di-t-butylfluorenyl)zirconium dichloride,
dimethylsilylene(dimethylcyclopentadienyl-2,7-di-t-butylfluorenyl)zirconium dichloride,
dimethylsilylene(ethylcyclopentadienyl-2,7-di-t-butylfluorenyl)zirconium dichloride,
dimethylsilylene(diethylcyclopentadienyl-2,7-di-t-butylfluorenyl)zirconium dichloride,
dimethylsilylene(methylcyclopentadienyl-octahydrofluorenyl)zirconium dichloride,
dimethylsilylene(dimethylcyclopentadienyl-octahydrofluorenyl)zirconium dichloride,
dimethylsilylene(ethylcyclopentadienyl-octahydrofluorenyl)zirconium dichloride,
dimethylsilylene(diethylcyclopentadienyl-octahydrofluorenyl)zirconium dichloride,
isopropylidene(cyclopentadienyl-indenyl)zirconium dichloride,
isopropylidene(methylcyclopentadienyl-indenyl)zirconium dichloride,
isopropylidene(dimethylcyclopentadienyl-indenyl) zirconium dichloride,
isopropylidene(ethylcyclopentadienyl-indenyl)zirconium dichloride,
isopropylidene(diethylcyclopentadienyl-indenyl)zirconium dichloride,
isopropylidene(cyclopentadienyl-benzoindenyl)zirconium dichloride,
isopropylidene(cyclopentadienyl-tetrahydroindenyl) zirconium dichloride,
isopropylidene(methylcyclopentadienyl-tetrahydroindenyl) zirconium dichloride,
isopropylidene(dimethylcyclopentadienyl-tetrahydroindenyl)zirconium dichloride,
isopropylidene(ethylcyclopentadienyl-tetrahydroindenyl) zirconium dichloride,
isopropylidene(diethylcyclopentadienyl-tetrahydroindenyl) zirconium dichloride,
dimethylsilylenebis(cyclopentadienyl)zirconium monohydride,
dimethylsilylenebis(cyclopentadienyl)zirconium dichloride,
dimethylsilylenebis(cyclopentadienyl)methylzirconium monochloride,
dimethylsilylenebis(cyclopentadienyl)dimethylzirconium,
dimethylsilylenebis(cyclopentadienyl)diphenylzirconium,
silylenebis(cyclopentadienyl)zirconium dichloride,
silylenebis(cyclopentadienyl)dimethylzirconium,
diethylsilylenebis(cyclopentadienyl)zirconium dichloride,
diethylsilylenebis(cyclopentadienyl)dimethyl zirconium,
dimethylsilylenebis(methylcyclopentadienyl)zirconium dihydride,
dimethylsilylenebis(indenyl)zirconium dichloride,
dimethylsilylenebis(indenyl)zirconium monochloride monohydride,
dimethylsilylenebis(indenyl)ethoxyzirconium chloride,
dimethylsilylenebis(indenyl)dimethyl zirconium,
dimethylsilylenebis(indenyl)diethyl zirconium,
dimethylsilylenebis(indenyl)diphenyl zirconium,
dimethylsilylenebis(indenyl)dibenzyl zirconium,
dimethylsilylenebis(indenyl)methylzirconium monobromide,
dimethylsilylenebis(indenyl)ethylzirconium monochloride,
dimethylsilylenebis(indenyl)benzylzirconium monochloride,
dimethylsilylenebis(indenyl)methylzirconium monochloride,
dimethylsilylenebis(indenyl)zirconium dibromide,
dimethylsilylenebis(4,5,6,7-tetrahydro-1-indenyl)dimethyl zirconium,
dimethylsilylenebis(4,5,6,7-tetrahydro-1-indenyl)ethyl zirconium ethoxide,
dimethylsilylenebis(4,5,6,7-tetrahydro-1-indenyl)zirconium dichloride,
dimethylsilylenebis(4,5,6,7-tetrahydro-1-indenyl)zirconium dibromide,
dimethylsilylenebis(4-methyl-1-indenyl)zirconium dichloride,
dimethylsilylenebis(5-methyl-1-indenyl)zirconium dichloride,
dimethylsilylenebis(6-methyl-1-indenyl)zirconium dichloride,
dimethylsilylenebis(7-methyl-1-indenyl)zirconium dichloride,
dimethylsilylenebis(2,3-dimethyl-1-indenyl)zirconium dichloride,
dimethylsilylenebis(4,7-dimethyl-1-indenyl)zirconium dichloride,
dimethylsilylenebis(4,7-dimethoxy-1-indenyl)zirconium dichloride,
dimethylsilylenebis(indenyl)zirconium methoxide,
dimethylsilylenebis(indenyl)zirconium diethoxide,
dimethylsilylenebis(indenyl)methoxyzirconium chloride,
dimethylsilylenebis(indenyl)ethoxyzirconium chloride,
dimethylsilylenebis(indenyl)methylzirconium chloride,
dimethylsilylenebis(4,5,6,7-tetrahydro-1-indenyl)zirconium dimethoxide,
dimethylsilylenebis(4,5,6,7-tetrahydro-1-indenyl)zirconium ethoxide diethoxide,
dimethylsilylenebis(4,5,6,7-tetrahydro-1-indenyl) methoxyzirconium chloride,
dimethylsilylenebis(4,5,6,7-tetrahydro-1-indenyl) ethoxyzirconium chloride,
dimethylsilylenebis(4,5,6,7-tetrahydro-1-indenyl) methylzirconium ethoxide,
dimethylsilylenebis(indenyl)zirconium dichloride,
diethylsilylenebis(indenyl)dimethyl zirconium,
dimethylsilylenebis(4,5,6,7-tetrahydro-1-indenyl)zirconium dichloride,
diethylsilylenebis(fluorenyl)zirconium dichloride,
dimethylsilylenebis(fluorenyl)dimethyl zirconium,
dimethylsilylenebis(fluorenyl)diphenyl zirconium,
dimethylsilylenebis(fluorenyl)zirconium dichloride,
dimethylsilylenebis(fluorenyl)diethyl zirconium,
dimethylsilylenebis(fluorenyl)zirconium dichloride,
ethylenebisindenylzirconium dichloride,
ethylenebisindenylzirconium dibromide,
ethylenebisindenyldimethylzirconium,
ethylenebisindenyldiphenylzirconium,
ethylenebisindenyldimethylzirconium monochloride,
ethylenebisindenylzirconiumbis(methanesulfonate),
ethylenebisindenylzirconiumbis(p-toluenesulfonate),
ethylenebisindenylzirconiumbis(trifluoromethanesulfonate), and ethylenebistetrahydroindenylzirconium dichloride.

Particularly preferred transition metal compounds are isopropylidene(cyclopentadienyl-fluorenyl)zirconium dichloride, isopropylidene(methylcyclopentadienyl-fluorenyl) zirconium dichloride, isopropylidene(isopropylcyclopentadienyl-fluorenyl) zirconium dichloride, isopropylidene(cyclopentadienyl-indenyl)zirconium dichloride, isopropylidene(cyclopentadienyl-benzoindenyl)zirconium dichloride, diphenylmethylene(cyclopentadienyl-indenyl)zirconium dichloride, and the like.

Illustrative examples of the compound as the catalyst component (a) in which the transition metal is titanium, hafnium, vanadium, niobium or tantalum include compounds in which the central metals of the above zirconium compounds are substituted by these metals.

These transition metal compounds may be carried on a carrier.

The organic aluminum oxy compound used as the catalyst component (b) may be known aluminoxane or an organic aluminum oxy compound which is benzene-insoluble as described in U.S. Pat. No. 4,990,640.

The known aluminoxane may be produced by the following processes, for example.

(1) A process comprising adding an organic aluminum compound such as trialkyl aluminum to a hydrocarbon medium suspension of a compound containing absorbed water or a salt containing water of crystallization, such as magnesium chloride hydrate, copper sulfate hydrate, aluminum sulfate hydrate, nickel sulfate hydrate or cerium (III) chloride hydrate, and reacting these compounds;

(2) a process comprising reacting an organic aluminum compound such as trialkyl aluminum directly with water or with ice or steam in a medium such as benzene, toluene, ethyl ether or tetrahydrofuran; and (2) a process comprising reacting an organic aluminum compound such as trialkyl aluminum with an organic tin oxide such as dimethyl tin oxide and dibutyl tin oxide in a medium such as decane, benzene or toluene.

The aluminoxane may contain a slight amount of an organic metal component. After a solvent or an unreacted organic aluminum compound is removed from the above solution of aluminoxane by evaporation, the thus obtained aluminoxane may be redissolved in the solvent or suspended in a poor solvent of aluminoxane.

Illustrative examples of the organic aluminum compound used in the preparation of aluminoxane include trialkyl aluminum such as trimethyl aluminum, triethyl aluminum, tripropyl aluminum, triisopropyl aluminum, tri-n-butyl aluminum, triisobutyl aluminum, tri-sec-butyl aluminum, tri-tert-butyl aluminum, tripentyl aluminum, trihexyl aluminum, trioctyl aluminum and tridecyl aluminum; tricycloalkyl aluminum such as tricyclohexyl aluminum and tricyclooctyl aluminum; dialkyl aluminum halides such as dimethyl aluminum chloride, diethyl aluminum chloride, diethyl aluminum bromide and diisobutyl aluminum chloride; dialkyl aluminum hydrides such as diethyl aluminum hydride and diisobutyl aluminum hydride; dialkyl aluminum alkoxides such as dimethyl aluminum methoxide and diethyl aluminum ethoxide; dialkyl aluminum aryloxides such as diethy aluminum phenoxide; and the like.

Among these, trialkyl aluminum and tricycloalkyl aluminum are preferred, and trimethyl aluminum is particularly preferred.

As the organic aluminum compound used in the preparation of aluminoxane, isoprenyl aluminum represented by the following general formula (IV) may also be used.

$$(i\text{-}C_4H_3)_xAl_y(C_5H_{10})_z \qquad (IV)$$

wherein x, y and z are positive numbers which satisfy $z \geq 2x$.

The above organic aluminum compounds may be used alone or in combination of two or more. For instance, trimethyl aluminum and triisobutyl aluminum are used in combination.

Illustrative examples of the solvent used in the preparation of aluminoxane include aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclopentane; petroleum fractions such as gasoline, kerosene and gas oil; and halides of the above aromatic hydrocarbons, aliphatic hydrocarbons and alicyclic hydrocarbons such as chlorides and bromides of these hydrocarbons. In addition, ethers such as ethyl ether and tetrahydrofuran may also be used. Among these, aromatic hydrocarbons and aliphatic hydrocarbons are particularly preferred.

As the compound which can form an ionic complex when it reacts with a transition metal compound as the catalyst component (b), a compound comprising cations and anions formed by bonding a plurality of groups to an element, particularly a complex, may be preferably used. The compound comprising cations and anions formed by bonding a plurality of groups to an element may be preferably selected from compounds represented by the following formulas (V) and (VI):

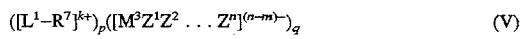

$$([L^1\text{-}R^7]^{k+})_p([M^3Z^1Z^2\ldots Z^n]^{(n-m)-})_q \qquad (V)$$

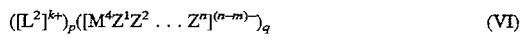

$$([L^2]^{k+})_p([M^4Z^1Z^2\ldots Z^n]^{(n-m)-})_q \qquad (VI)$$

wherein $L^1$ is a Lewis base, $M^3$ and $M^4$ are each selected from groups VB, VIB, VIIB, VIII, IB, IIB, IIIA, IVA and VA of the periodic table, $L^2$ is $M^5$, $R^8R^9M^6$, $R^{10}{}_3C$ or $R^{11}M^6$, $M^5$ and $M^6$ are each selected from groups IIIB, IVB, VB, VIB, VIIB, VIII, IA, IB, IIA, IIB and VIIA of the periodic table, $R^8$ and $R^9$ are each selected from the group consisting of a cyclopentadienyl group, substituted cyclopentadienyl group, indenyl group and fluorenyl group, $R^{10}$ is selected from the group consisting of an alkyl group having 1 to 20 carbon atoms, aryl group having 6 to 20 carbon atoms, alkyl aryl group and aryl alkyl group, $R^{11}$ is a large cyclic ligand such as tetraphenyl porphyrin and phthalocyanine, $Z^1$ to $Z^n$ are each selected from the group consisting of a hydrogen atom, dialkyl amino group, alkoxy group having 1 to 20 carbon atoms, aryl oxy group having 6 to 20 carbon atoms, alkyl group having 1 to 20 carbon atoms, aryl group having 6 to 20 carbon atoms, alkyl aryl group, aryl alkyl group, halogen substituted hydrocarbon group having 1 to 20 carbon atoms, acyloxy group having 1 to 20 carbon atoms, organic metalloid group and halogen atom, two or more out of $Z^1$ to $Z^n$ may be bonded together to form a ring, $R^7$ is a hydrogen atom, alkyl group having 1 to 20 carbon atoms, aryl group having 6 to 20 carbon atoms, alkyl aryl group or aryl alkyl group, m is an integer of 1 to 7 representing a valence of $M^3$ and $M^4$, n is an integer of 2 to 8, k is an integer of 1 to 7 representing an ionic valency of $[L^1-R^7]$ and $[L^2]$, and p is an integer of 1 or more and satisfies $q=(p \times k)/(n-m)$.

Illustrative examples of the Lewis base include amines such as ammonia, methylamine, aniline, dimethylamine, diethylamine, N-methylaniline, diphenylamine, trimethylamine, triethylamine, tri-n-butylamine, N,N-dimethylaniline, methyldiphenylaniline, pyridine, p-bromo-N,N-dimethylaniline, p-nitro-N,N-dimethylaniline; phosphines such as triethylphosphine, triphenylphosphine and diphenylphosphine; ethers such as dimethyl ether, diethyl ether, tetrahydrofuran and dioxane; thioethers such as diethyl thioether and tetrahydrothiophene; esters such as ethyl benzoate; and the like.

Examples of $M^3$ and $M^4$ include B, Al, Si, P, As, Sb and the like, those of $M^5$ include La, Na, Ag, Cu, Br, I, $I^3$ and the like, and those of $M^6$ include Mn, Fe, Co, Ni, Zn and the like. Examples of $Z^1$ to $Z^n$ include dialkyl amino group such as dimethyl amino and diethyl amino; alkoxy group having 1 to 20 carbon atoms such as methoxy, ethoxy and n-butoxy; aryl oxy group having 6 to 20 carbon atoms such as phenoxy, 2,6-dimethyl phenoxy and naphthyloxy; alkyl group having 1 to 20 carbon atoms such as methyl, ethyl, n-propyl, i-propyl, n-butyl, n-octyl and 2-ethylhexyl; aryl group having 6 to 20 carbon atoms, alkyl aryl group or aryl alkyl group such as phenyl, p-tolyl, benzyl, 4-t-butylphenyl, 2,6-dimethylphenyl, 3,5-dimethylphenyl, 2,4-dimethylphenyl and 2,3-dimethylphenyl; halogen substituted hydrocarbon group having 1 to 20 carbon atoms such as p-fluorophenyl, 3,5-difluorophenyl, pentachlorophenyl, 3,4,5-trifluorophenyl, pentafluorophenyl and 3,5-di(trifluoromethyl)phenyl; halogen atom such as F, Cl Br and I; organic metalloid compounds such as pentamethyl antimony, trimethyl silyl, trimethylgermyl, diphenylarsine, dicyclohexylantimony and diphenyl boron; and the like.

Examples of $R^7$ and $R^{10}$ are the same as those provided in the foregoing. As the substituted cyclopentadienyl group for $R^8$ and $R^9$, what is substituted by an alkyl group such as methylcyclopentadienyl, butylcyclopentadienyl or pentamethylcyclopentadienyl is used. The alkyl group has typically 1 to 6 carbon atoms and the number of substituted alkyl groups is an integer of 1 to 5.

Among the compounds represented by the above formulas (V) and (VI), compounds in which $M^3$ and $M^4$ are boron are preferred.

Among the compounds represented by the above formulas (V) and (VI), the following compounds may be particularly preferably used.

Compounds of formula (V)

triethylammonin tetraphenylborate,
tri(n-butyl)ammonium tetraphenylborate,
trimethylammonium tetraphenylborate,
tetraethylammonium tetraphenylborate,
methyltri(n-butyl)ammonium tetraphenylborate,
benzyltri(n-butyl)ammonium tetraphenylborate,
dimethyldiphenylammonium tetraphenylborate,
methyltriphenylammonium tetraphenylborate,
trimethylanilinium tetraphenylborate,
methylpyridinium tetraphenylborate,
benzylpyridinium tetraphenylborate,
methyl(2-cyanopyridinium) tetraphenylborate,
benzyldimethylsulfonium tetraphenylborate,
trimethylsulfonium tetraphenylborate,
triethylammonium tetra(pentafluorophenyl)borate,
tri(n-butyl)ammonium tetra(pentafluorophenyl)borate,
triphenylammonium tetra(pentafluorophenyl)borate,
tetrabutylammonium tetra(pentafluorophenyl)borate,
tetraethylammonium tetra(pentafluorophenyl)borate,
methyltri(n-butyl)ammonium tetra(pentafluorophenyl) borate,
benzyltri(n-butyl)ammonium tetra(pentafluorophenyl) borate,
methyldiphenylammonium tetra(pentafluorophenyl)borate,
methyltriphenylammonium tetra(pentafluorophenyl)borate,
dimethyldiphenylammonium tetra(pentafluorophenyl) borate,
anilinium tetra(pentafluorophenyl)borate,
methylanilinium tetra(pentafluorophenyl)borate,
dimethylanilinium tetra(pentafluorophenyl)borate,
trimethylanilinium tetra(pentafluorophenyl)borate,
dimethyl(m-nitroanilinium) tetra(pentafluorophenyl)borate,
dimethyl(p-bromoanilinium) tetra(pentafluorophenyl) borate,
pyridinium tetra(pentafluorophenyl)borate,
(p-cyanopyridinium) tetra(pentafluorophenyl)borate,
(N-methylpyridinium) tetra(pentafluorophenyl)borate,
(N-benzylpyridinium) tetra(pentafluorophenyl)borate,
(o-cyano-N-methylpyridinium) tetra(pentafluorophenyl) borate,
(p-cyano-N-methylpyridinium) tetra(pentafluorophenyl) borate,
(p-cyano-N-benzylpyridinium) tetra(pentafluorophenyl) borate,
trimethylsulfonium tetra(pentafluorophenyl)borate,
benzyldimethylsulfonium tetra(pentafluorophenyl)borate,
tetraphenylsulfonium tetra(pentafluorophenyl)borate,
dimethylanilinium tetra(3,5-ditrifluoromethylphenyl)borate,
and triethylammonium hexafluoroarsenate.

Compounds of formula (VII)

ferrocenyl tetraphenylborate,
silver tetraphenylborate,
tritphenylcarmium tetraphenylborate,
tetraphenylporphyrin manganese tetraphenylborate,
ferrocenyl tetra(pentafluorophenyl)borate,
1,1'-dimethylferrocenyl tetra(pentafluorophenyl)borate,
decamethylferrocenyl tetra(pentafluorophenyl)borate,
acetylferrocenyl tetra(pentafluorophenyl)borate,
formylferrocenyl tetra(pentafluorophenyl)borate,
cyanoferrocenyl tetra(pentafluorophenyl)borate,
silver tetra(pentafluorophenyl)borate,
triphenylcarbenium tetra(pentafluorophenyl)borate,
lithium tetra(pentafluorophenyl)borate,
sodium tetra(pentafluorophenyl)borate,
tetraphenylporphyrin manganese tetra(pentafluorophenyl)borate,
tetraphenylporphyrin (chloro) ferric tetra(pentafluorophenyl)borate,
tetraphenylporphyrin zinc tetra(pentafluorophenyl)borate,
silver tetrafluoroborate,
silver tetrafluoroarsenate, and silver tetrafluoroantnonate.

Compounds other than those of the formulas (V) and (VI) such as tri(pentafluorophenyl)boron, tri(3,5-di(trifluoromethyl)phenyl)boron, and triphenyl boron may also be used.

The organic aluminum compound as the catalyst component (c) used as required in the present invention is an organic aluminum compound represented by the following general formula (VII):

$$R^1_n AlX_{3-n} \qquad (VII)$$

wherein $R^1$ is a hydrocarbon group having 1 to 12 carbon atoms, X is a halogen atom or a hydrogen atom, and n is an integer of 1 to 3.

In the above general formula (VII), $R^1$ is a hydrocarbon group having 1 to 12 carbon atoms, such as alkyl group, cycloalkyl group or aryl group. More specifically, it is selected from methyl, ethyl, n-propyl, isopropyl, isobutyl, pentyl, hexyl, octyl, cyclopentyl, cyclohexyl, phenyl, tolyl and the like.

Specific examples of the organic aluminum compound include trialkyl aluminum such as trimethyl aluminum, triethyl aluminum, triisopropyl aluminum, triisobutyl aluminum, trioctyl aluminum and tri-2-ethylhexyl aluminum; alkenyl aluminum such as isoprenyl aluminum; dialkyl aluminum halides such as dimethyl aluminum chloride, diethyl aluminum chloride, diisopropyl aluminum chloride, diisobutyl aluminum chloride and dimethyl aluminum bromide; alkyl aluminum sesquihalides such as methyl aluminum sesquichloride, ethyl aluminum sesquichloride, isopropyl aluminum sesquichloride, butyl aluminum sesquichloride and ethyl aluminum sesquibromide; alkyl aluminum dihalides such as methyl aluminum dichloride, ethyl aluminum dichloride, isopropyl aluminum dichloride and ethyl aluminum dibromide; alkyl aluminum hydrides such as diethyl aluminum hydride and diisobutyl aluminum hydride; and the like.

As the organic aluminum compound, compounds represented by the following general formula (VIII) may also be used.

$$R^1{}_n AlY_{3-n} \quad (VIII)$$

wherein n is 1 or 2, $R^1$ is defined the same as in the above formula (VII), Y is a group represented by $-OR^2$, $-OSiR^3{}_3$, $-OAlR^4{}_2$, $-NR^5{}_2$, $-SiR^6{}_3$ or $-N(R^7)AlR^8{}_2$, $R^2$, $R^3$, $R^4$ and $R^8$ are each selected from the group consisting of a methyl group, ethyl group, isopropyl group, isobutyl group, cyclohexyl group and phenyl group, $R^5$ is selected from the group consisting of a hydrogen atom, methyl group, ethyl group, isopropyl group, phenyl group and trimethyl silyl group, and $R^6$ and $R^7$ are each a methyl group or an ethyl group.

Illustrative examples of the organic aluminum compound represented by the formula (VIII) include:

(1) compounds represented by $R^1{}_n Al(OR^2)_{3-n}$, such as dimethyl aluminum methoxide, diethyl aluminum ethoxide and diisobutyl aluminum methoxide;

(2) compounds represented by $R^1{}_n Al(OSiR^{3-3})_{3-n}$, such as $Et_2Al(OSiMe_3)$, $(iso-Bu)_2Al(OSiMe_3)$ and $(iso-Bu)_2Al(OSiEt_3)$;

(3) compounds represented by $R^1{}_n Al(OAlR^4{}_2)_{3-n}$, such as $Et_2AlOAlEt_2$ and $(iso-Bu)_2AlOAl(iso-Bu)_2$;

(4) compounds represented by $R^1{}_n Al(NR^5{}_2)_{3-n}$, such as $Me_2AlNEt_2$, $Et_2AlNHMe$, $Me_2AlNEt$, $Et_2AlN(SiMe_3)_2$ and $(iso-Bu)_2AlN(SiMe_3)_2$;

(5) compounds represented by $R^1{}_n Al(SiR^6{}_3)_{3-n}$, such as $(iso-Bu)_2AlSiMe_3$; and (6) compounds represented by $R^1{}_n Al(N(R^7)AlR^8{}_2)_{3-n}$, such as $Et_2AlN(Me)AlEt_2$ and $(iso-Bu)_2AlN(Et)Al(iso-Bu)_2$.

Among the organic aluminum compounds represented by the above general formulas (VII) and (VIII), the compounds represented by $R^1{}_3Al$, $R^1{}_n Al(OR^2)_{3-n}$ and $R^1{}_n Al(OAlR^4{}_2)_{3-n}$ are preferred, and compounds in which $R^1$ is an isoalkyl group and n is 2 are particularly preferred.

As described above, the catalyst used in the process of the present invention contains a transition metal compound as the catalyst component (a), an organic aluminum oxy compound and/or a compound which is able to form an ionic complex when it reacts with a transition metal compound as the catalyst component (b), and an organic aluminum compound as the catalyst component (c) as required. The catalyst may contain other components useful for polymerization, in addition to these components.

According to the process of the present invention, copolymerization between α-olefin and cycloolefin in the presence of the above catalyst is carried out in a mixture of hydrocarbon solvents having specific solubility parameters (value of δ).

That is, according to the present invention, as the solvent used for copolymerization, a mixture of (i) a hydrocarbon solvent having a solubility parameter (value of δ) of 7.7 $[(cal/cm^3)^{1/2}]$ or more, preferably 7.7 to 8.7 $[(cal/cm^3)^{1/2}]$ and (ii) a hydrocarbon solvent having a solubility parameter (value of δ) of 7.5 $[(cal/cm^3)^{1/2}]$ or less, preferably 7.4 $[(cal/cm^3)^{1/2}]$ or less.

Illustrative examples of the above solvent (i) having a solubility parmeter (value of δ) of 7.7 $[(cal/cm^3)^{1/2}]$ or more include the following compounds.

| solvent (i) | value of δ |
|---|---|
| toluene | 8.9 |
| cyclopentane | 8.7 |
| cyclohexane | 8.2 |
| methylcyclohexane | 7.8 |

Illustrative examples of the above solvent (ii) having a solubility parameter of 7.5 $[(cal/cm^3)^{1/2}]$ or less include the following compounds.

| solvent (ii) | value of δ |
|---|---|
| heptane | 7.4 |
| n-hexane | 7.3 |
| n-pentane | 7.0 |
| n-butane | 6.8 |
| decane | 6.6 |
| propane | 6.4 |

The above hydrocarbon solvents (i) and the above hydrocarbon solvents (ii) may be each used alone or in combination of two or more.

The volume ratio [(i)/(ii)] of the hydrocarbon solvent (i) to the hydrocarbon solvent (ii) is 99/1 to 50/50, preferably 90/10 to 50/50, particularly preferably 85/15 to 60/40.

Exemplary combinations of the hydrocarbon solvent (i) and the hydrocarbon solvent (ii) are as follows.

cyclohexane/hexane
cyclohexane/heptane
cyclohexane/octane
cyclohexane/decane
methylcylohexane/hexane
methylcylohexane/heptane
methylcyclohexane/octane
methylcyclohexane/decane According to the present invention, by carrying out copolymerization between α-olefin and cycloolefin in a mixture of the above hydrocarbon solvents (i) and (ii), the viscosity of a polymer solution can be reduced, polymerization heat can be easily removed, uniformity of monomer distribution in a polymerizer is improved and transportability of the polymer solution is enhanced. In addition, by using these specific hydrocarbon solvents, catalytic activity is not impaired and the degree of cycloolefin conversion is high. When a copolymer having the same molecular weight is to be produced by the process of the present invention, the copolymer can be produced in a higher concentration than the prior art. Further, when the copolymer is to be produced in a copolymer solution having the same concentration, a copolymer having a higher molecular weight can be produced than the prior art. Therefore, according to the present invention, a cycloolefin copolymer can be produced by a relatively simple means economically and at a high yield as a whole.

To carry out the copolymerization of the present invention, the transition metal compound in the polymer solution is typically contained in an amount of 0.00005 to 1.0 mmol, preferably about 0.0001 to 0.3 mmol, based on 1 liter of the polymer solution, and the organic aluminum oxy compound is used such that aluminum atoms in the organic aluminum oxy compound are typically contained in an amount of 1 to 10,000 mols, preferably 10 to 5,000 mols, based on 1 mol of the transition metal atom contained in the transition metal compound, or the compound which can form an ionic complex when it reacts with a transition metal compound is used such that aluminum atoms are contained in an amount of 0.01 to 100 mols, preferably 0.5 to 5 mols based on 1 mol of the transition metal atom.

Polymerization temperature for carrying out the process of the present invention is typically −50° to 230° C., preferably −30° to 200° C., more preferably −20° to 150° C. Polymerization pressure is typically more than 0 to 100 kg/cm$^2$·G, more preferably more than 0 to 50 kg/cm$^2$·G. A copolymerization reaction can be carried out in either one of batch, semi-continuous and continuous manners. Further, polymerization can be carried out in two or more steps which differ in reaction conditions. Reaction time (average residence time of a polymerization reaction mixture when copolymerization is carried out in a continuous manner), which differs according to types of monomers used, catalyst concentration and polymerization temperature, is typically 2 minutes to 5 hours, preferably 5 minutes to 3 hours.

According to the process for the production of a cycloolefin random copolymer of the present invention, use of a specific hydrocarbon solvent mixture described above as a copolymerization solvent suppresses an increase in the viscosity of the polymer solution, thereby making it easy to remove polymerization heat, maintain uniform distribution of monomer components in the system and transport the polymer solution. Since catalytic activity is not impaired by using this specific hydrocarbon solvent mixture, a cycloolefin copolymer can be produced at a high degree of cycloolefin conversion. As the result, a copolymer having a high molecular weight can be produced by a relatively simple means economically and at a high yield as a whole.

To further illustrate this invention, and not by way of limitation, the following examples are given.

EXAMPLE 1 preliminary activation of catalyst 10.0 mg of isopropylidene (cyclopentadienyl-fluorenyl) zirconium dichloride was measured and mixed with a toluene solution of methylaluminoxane (to be abbreviated as MAO hereinafter) in a glass container fully substituted with nitrogen so that the final amount of aluminum atoms should be 9.25 mmols (4.67 ml). The resulting solution was exposed to ultrasonic waves at 23° C. for 15 minutes and then diluted with 42.1 ml of toluene to prepare a catalyst solution.

polymerization 88.7 g of norbornene (to be abbreviated as NB hereinafter), 136.2 ml of toluene, 34.1 ml of n-hexane, and 0.3 ml of a toluene solution of triisobutyl aluminum (triisobutyl aluminum concentration: 1.0 mmol/ml) were added to a 1.5-liter autoclave which was dried under reduced pressure and substituted with nitrogen at normal temperature. Subsequently, the autoclave was pressurized to 4 kg/cm$^2$·G with ethylene under agitation and depressurized three times. The autoclave was then pressurized to 1.5 kg/cm$^2$·G with ethylene and temperature inside the autoclave was elevated to 70° C. Thereafter, the autoclave was pressurized with ethylene to achieve an inner pressure of 6 kg/cm$^2$·G. After 15 minutes of agitation, 3.03 ml of a toluene solution containing isopropylidene(cyclopentadienyl-fluorenyl)zirconium dichloride and MAO prepared in advance was added to the autoclave to start copolymerization between ethylene and NB. At this point, the addition was carried out in such a manner that the concentration of isopropylidene (cyclopentadienyl-fluorenyl)zirconium dichloride should be 0.005 mmol/ml and that of MAO 2.0 mmols/ml based on the polymer solution at the beginning of polymerization. Ethylene was supplied continuously during polymerization to maintain pressure inside the autoclave at 6 kg/cm$^2$·G. After 60 minutes, a polymerization reaction was stopped by adding isopropyl alcohol. After depressurization, the polymer solution was taken out and contacted with an aqueous solution prepared by adding 5 ml of concentrated hydrochloric acid to 1 l of water in a ratio of 1:1 using a homomixer under agitation to shift the residual catalyst to a water phase. This contact solution mixture was left to stand and its water phase was separated and removed. Further, it was washed with distilled water two times to purify and separate a polymerization liquid phase.

Thereafter, the purified and separated polymerization liquid phase was contacted with 3 volumes of acetone under strong agitation to deposit a copolymer. This solid (copolymer) was separated by filtration and washed completely with acetone. To extract unreacted TCD present in the polymer, the solid was injected into acetone in a solid/acetone ratio of 40 g/liter. Thereafter, extraction was carried out at 60° C. for 2 hours. After the extraction, the solid was separated by filtration and dried at 130° C. at 350 mmHg for 12 hours under nitrogen air stream.

The yield of an ethylene/NB copolymer thus obtained was 55.5 g, its intrinsic viscosity [η] measured in a decaline solvent at 135° C. was 1.3 dl/g, its glass transition temperature Tg was 110° C., its NB content was 47.4 mol %, and its catalyst activity was 37,000 g/mmol Zr. Results obtained are shown in Table 1.

EXAMPLE 2

Copolymerization was carried out in the same manner as in Example 1 except that ethylene was supplied in such a manner that pressure inside the autoclave at the time of copolymerization was maintained at 10 kg/cm$^2$·G. Results obtained are shown in Table 1.

EXAMPLE 3

Copolymerization was carried out in the same manner as in Example 1 except that a mixture of cyclohexane and n-hexane (volume ratio of 80/20) was used as a polymerization solvent. Results obtained are shown in Table 1.

EXAMPLE 4

Copolymerization was carried out in the same manner as in Example 1 except that a mixture of cyclohexane and n-hexane (volume ratio of 70/30) was used as a polymerization solvent. Results obtained are shown in Table 1.

COMPARATIVE EXAMPLE 1

Copolymerization was carried out in the same manner as in Example 1 except that toluene was used alone as a polymerization solvent. Results obtained are shown in Table 1. Compared with the case where a solvent mixture was used (Example 1), the intrinsic viscosity [η] and molecular weight of the copolymer were small and Tg of the copolymer was low.

COMPARATIVE EXAMPLE 2

Copolymerization was carried out in the same manner as in Example 1 except that n-hexane was used alone as a polymerization solvent. Results obtained are shown in Table 1. A copolymer became insoluble during polymerization and the polymer solution was whitened. Compared with the case where a solvent mixture was used (Example 1), the catalyst activity of the copolymer was low and its yield was small.

TABLE 1

| | solvent (i)/(ii) | value of δ (i)/(ii) | ratio (i)/(ii) | type of cycloolefin | (g) | ethylene pressure (kg/cm²G) | Zr (mM/L) |
|---|---|---|---|---|---|---|---|
| Example 1 | toluene/n-hexane | 8.9/7.3 | 80/20 | NB | 88.7 | 6 | 0.005 |
| Example 2 | toluene/n-hexane | 8.9/7.3 | 80/20 | NB | 88.7 | 10 | 0.005 |
| Example 3 | cyclohexane/n-hexane | 8.2/7.3 | 80/20 | NB | 88.7 | 6 | 0.005 |
| Example 4 | cyclohexane/n-hexane | 8.2/7.3 | 70/30 | NB | 88.7 | 6 | 0.005 |
| Comparative Example 1 | toluene | 8.9 | 100/0 | NB | 88.7 | 6 | 0.005 |
| Comparative Example 2 | n-hexane | 7.3 | 0/100 | NB | 88.7 | 6 | 0.005 |

| | MAO (mM/L) | TIBA (mM/L) | yield (g) | activity (g/mMZr) | Tg (°C.) | [η] (dl/g) | content of cycloolefin (mol %) |
|---|---|---|---|---|---|---|---|
| Example 1 | 2.0 | 4.0 | 55.5 | 37,000 | 110 | 1.31 | 47.4 |
| Example 2 | 2.0 | 4.0 | 72.0 | 48,000 | 93 | 1.33 | 38.5 |
| Example 3 | 2.0 | 4.0 | 57.0 | 38,000 | 128 | 1.41 | 46.9 |
| Example 4 | 2.0 | 4.0 | 58.5 | 39,000 | 131 | 1.35 | 47.3 |
| Comparative Example 1 | 2.0 | 4.0 | 52.5 | 35,000 | 95 | 1.29 | 38.4 |
| Comparative Example 2 | 2.0 | 4.0 | 27.0 | 18,000 | 145 | 1.37 | 49.7 |

What is claimed is:

1. A process for the production of a cycloolefin copolymer which comprises copolymerizing (1) an α-olefin having 2 or more carbon atoms and (2) at least one cycloolefin selected from the group consisting of monomers represented by the following formula (I):

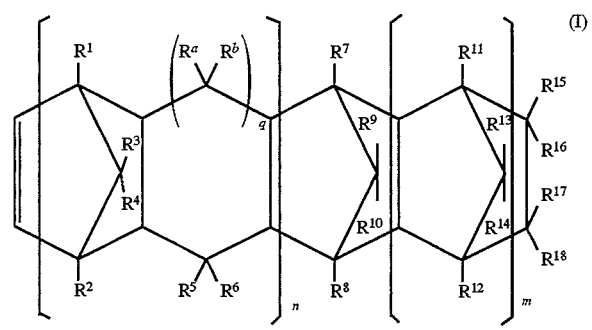

wherein n is 0 or 1, m is 0 or a positive integer, q is 0 or 1, $R^1$ to $R^{18}$, $R^a$ and $R^b$ are independently selected from the group consisting of a hydrogen atom, halogen atom and hydrocarbon group, two out of $R^{15}$ to $R^{18}$ may jointly form a single hydrocarbon ring or multiple hydrocarbon rings including carbon atoms bonded thereto, and the single ring or multiple rings may have a double bond, and $R^{15}$ and $R^{16}$ or $R^{17}$ and $R^{18}$ may form an alkylidene group, and by the following formula (II):

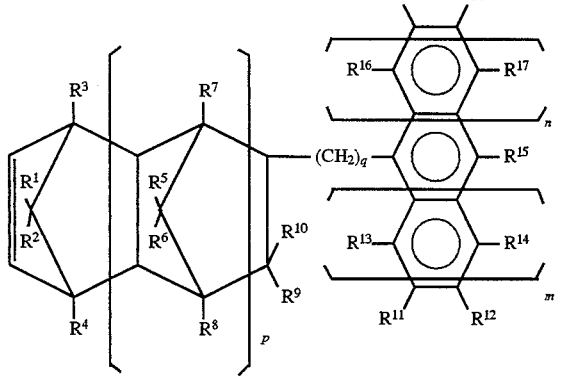

wherein p and q are each 0 or an integer of 1 or more, m and n are each 0, 1 or 2, $R^1$ to $R^{19}$ are independently selected from the group consisting of a hydrogen atom, halogen atom, aliphatic hydrocarbon group, alicyclic hydrocarbon group, aromatic hydrocarbon group and alkoxy group, the carbon atom bonded to $R^9$ and $R^{10}$ and the carbon atom bonded to $R^{13}$ or $R^{11}$ may be bonded together directly or through an alkylene group having 1 to 3 carbon atoms, and $R^{15}$ and $R^{12}$ or $R^{15}$ and $R^{19}$ may jointly form a monocyclic or polycyclic aromatic ring including carbon atoms bonded thereto when n=m=0.

in the presence of a catalyst formed from a transition metal compound catalyst component (a) represented by the following formula (III):

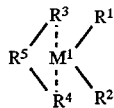

wherein $M^1$ is titanium, zirconium, hafnium, vanadium, niobium or tantalum, $R^1$ and $R^2$ are independently selected from the group consisting of a hydrogen atom, halogen atom, alkyl group having 1 to 10 carbon atoms, alkoxy group having 1 to 10 carbon atoms, aryl group having 6 to 10 carbon atoms, aryl oxy group having 6 to 10 carbon atoms, alkenyl group having 2 to 10 carbon atoms, aryl alkyl group having 7 to 40 carbon atoms, alkyl aryl group having 7 to 40 carbon atoms and aryl alkenyl group having 8 to 40 carbon atoms, $R^3$ and $R^4$ are independently a mononuclear or polynuclear hydrocarbon group having a cyclopentadienyl skeleton capable of forming a sandwich structure together with a central metal $M^1$, and $R^5$ is one of the following divalent groups:

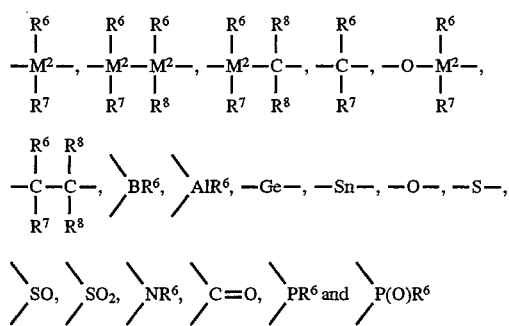

in which $R^6$, $R^7$ and $R^8$ are independently selected from the group consisting of a hydrogen atom, halogen atom, alkyl group having 1 to 10 carbon atoms, fluoroalkyl group having 1 to 10 carbon atoms, fluoroaryl group having 6 to 10 carbon atoms, aryl group having 6 to 10 carbon atoms, alkoxy group having 1 to 10 carbon atoms, alkenyl group having 2 to 10 carbon atoms, aryl alkyl group having 7 to 40 carbon atoms, alkyl aryl group having 7 to 40 carbon atoms and alkyl alkenyl group having 8 to 40 carbon atoms, $R^6$ and $R^7$ or $R^6$ and $R^8$ may jointly form a ring including an atom bonded thereto, and $M^2$ is silicon, germanium or tin, and at least one catalyst component (b) selected from the group consisting of organic aluminum oxy compounds and compounds capable of forming an ionic complex when they react with said transition metal compound, in a solvent mixture containing a hydrocarbon solvent (i) having a solubility parameter of 7.7 $(cal/cm^3)^{1/2}$ or more and a hydrocarbon solvent (ii) having a solubility parameter of 7.5 $(cal/cm^3)^{1/2}$ or less in a volume ratio (i)/(ii) of 99/1 to 50/50, wherein a combination of the hydrocarbon solvent (i) and the hydrocarbon solvent (ii) is any one of combinations selected from the group consisting of cyclohexane and hexane, cyclohexane and heptane, cyclohexane and octane, cyclohexane and decane, methylcyclohexane and hexane, methylcyclohexane and heptane, methylcyclohexane and octane, and methylcyclohexane and decane.

2. The production process of claim 1, wherein an organic aluminum compound is further used as a catalyst component (c) to form the catalyst.

3. The production process of claim 1, wherein the volume ratio of the hydrocarbon solvent (i) to the hydrocarbon solvent (ii) is 90/10 to 50/50.

4. The production method of claim 1, wherein the α-olefin to be copolymerized with the cycloolefin is ethylene.

5. The production method of claim 4, wherein the cycloolefin is norbornene.

* * * * *